United States Patent [19]

Gullickson

[11] Patent Number: 4,951,957
[45] Date of Patent: Aug. 28, 1990

[54] TRAILER HITCH

[76] Inventor: Russell C. Gullickson, 1001 West 4th St., Laurel, Mont. 59044

[21] Appl. No.: 415,562

[22] Filed: Oct. 2, 1989

[51] Int. Cl.⁵ .............................................. B62D 53/00
[52] U.S. Cl. ................................ 280/479.2; 280/479.3; 280/499
[58] Field of Search ............... 280/478.1, 479.2, 479.3, 280/482, 491.1, 491.2, 493, 494, 499

[56] References Cited

U.S. PATENT DOCUMENTS

| | | | |
|---|---|---|---|
| 3,279,819 | 10/1966 | Edmonds | 280/479.3 |
| 3,410,577 | 11/1968 | Luinstra | 280/479.2 |
| 3,891,238 | 6/1975 | Ehlert | 280/499 X |

Primary Examiner—Charles A. Marmor
Assistant Examiner—Victor E. Johnson
Attorney, Agent, or Firm—Richard C. Conover

[57] ABSTRACT

A wide-range hitch assembly which mounts on a towing vehicle is provided wherein a hitch ball can be pivoted in an arc and extended or retracted to simplify mating the hitch ball with a cooperating ball hitch fitted on a towed vehicle. The present invention includes a rectangular housing holding a conventional rectangular receiver tube mounted for pivotal movement within the interior of the housing. The receiver tube has pin receiving bores located in the top and bottom walls which bores may be coaxially aligned with corresponding bores in the top and bottom walls of the housing. A drawbar, slidably positioned within the receiver tube, has a bore therethrough which bore may be positioned in coaxial alignment with the bores through the receiver tube. A pin is used to automatically lock the receiver tube in a central, proper towing position as the receiver tube is centered for towing and then the drawbar retracted.

4 Claims, 3 Drawing Sheets

TRAILER HITCH

BACKGROUND OF THE INVENTION

This invention relates to an improved wide-range towing hitch which may be used to couple a trailing vehicle to a towing vehicle, without having to precisely position the towing vehicle in a position for coupling the two vehicles together as is the case with conventional towing hitches.

Various wide-range tow hitches are known such as described in U.S. Pat. No. 3,622,182 to Grosse-Rhode; U.S. Pat. No. 4,265,465 to Deitrich, Sr.; U.S. Pat. No. 4,515,387 to Schuck; U.S. Pat. No. 3,279,825 to Boutwell; U.S. Pat. No. 3,126,210 to Hill; U.S. Pat. No. 3,140,881 to Antici; U.S. Pat. No. 4,603,878 to Smith, Jr.; and U.S. Pat. No. 3,243,202 to Carson.

Previous wide-range trailer hitches have generally extended to the rear of the towing vehicle beyond the bumper where they could bump into other objects when the hitch was not in use. In many cases a locking pin handle extended upward from the hitch where it was possible to snag clothing or to catch an operator as he worked around the trailer hitch. Further, some of these trailer hitches had a complicated internal structure to achieve the capability of positioning a drawbar throughout a given range to match a towing ball with a ball hitch on the towed vehicle. A wide-range trailer hitch is needed which combines the better features of the conventional trailer hitches to provide an improved trailer hitch which has fewer and simpler components, is simple to manufacture, mounts out of the way of an operator when the trailer hitch is not in use, is protected from mud and water being splashed by the rear wheels of a towing vehicle, and has a locking pin handle positioned alongside the trailer hitch to reduce the possibility of snags or injury.

SUMMARY OF INVENTION

The wide-range hitch of the present invention is directed to an improved structure which is simple in manufacture and which can be used with a conventional rectangular receiver tube commonly used today for receiving drawbars.

The present invention relates to a structure which can be installed at the factory on vehicles or can be retro-fitted on vehicles when a trailer hitch is desired. The present invention has few movable components, is simple in design, durable, and can provide for positive locking of the trailer hitch by a driver in an operative towing position without the necessity of the driver leaving the vehicle when the hitching operation is being accomplished.

The present invention relates to a wide-trailer hitch mounted on a towing vehicle which hitch includes a rectangular housing to shield the operative components of the trailer hitch from mud and water splashed by the rear wheels of the towing vehicle. The present invention incorporates a conventional and widely used rectangular receiver tube mounted for pivotal movement within the interior of the housing. The receiver tube has a pin receiving bore located in top and bottom walls of the receiver tube which may be coaxially aligned with corresponding bores in the housing. A cam member is mounted on the bottom wall of the receiver tube to cover the bore in the lower wall of the housing whenever the receiver tube is rotated away from its normal towing position. The cam member includes a bore therethrough fixedly aligned with the bore in the bottom wall of the receiver tube. Thus, the receiver tube is prevented from being locked in any position other than a central normal towing position.

A drawbar is slidably positioned within the receiver tube, and may be moved from a fully retracted position to a fully extended position. The drawbar includes a bore therethrough which may be positioned in coaxial alignment with the bore through the receiver tube upon slidable movement of the drawbar within the receiver tube.

Finally, a pin is received by the bores in the housing, the receiver tube, and the drawbar when these bores are coaxially aligned. This pin is mounted at one end of a pin withdrawal member which member in turn is pivotally mounted to the rectangular housing. Springs are provided for resiliently urging the pin withdrawal member toward the bottom of the housing, thus, the pin is resiliently urged into the bores of the housing, the receiver tube, and drawbar when these bores are coaxially aligned. When the pin is positioned within these bores, the towed vehicle is operatively connected to the towing vehicle for towing.

When it is desired to couple the towed vehicle to the towing vehicle, the operator positions the towing vehicle with the towing ball in proximity to the ball hitch of the towed vehicle, although not precisely under the ball hitch as is required with conventional trailer hitches. The operator then manually withdraws the pin from the bores and manipulates the towing ball to a position to be received by the ball hitch of the towed vehicle. The operator then enters the vehicle and drives forwardly. This motion rotates the receiver tube to a central position in the housing and the pin is urged by the springs into the receiver tube to lock the receiver tube in this central position. Next the driver either slows down or reverses the direction of the towing vehicle to retract the drawbar until the pin is urged by the springs into the corresponding bore of the drawbar to lock the drawbar in a towing position. The structure of the present invention allows a vehicle driver to automatically position the pin in the bores of the improved wide-range hitch to lock the drawbar in a proper towing position without having the driver manually position the towing ball precisely under the ball hitch of the towed vehicle.

BRIEF DESCRIPTION OF THE DRAWINGS

In order that the invention may be clearly understood and readily carried into effect, preferred embodiments of the invention will now be described, by way of example only, with reference to the accompanying drawings wherein.

DESCRIPTION OF PREFERRED EMBODIMENTS

Figure 1:
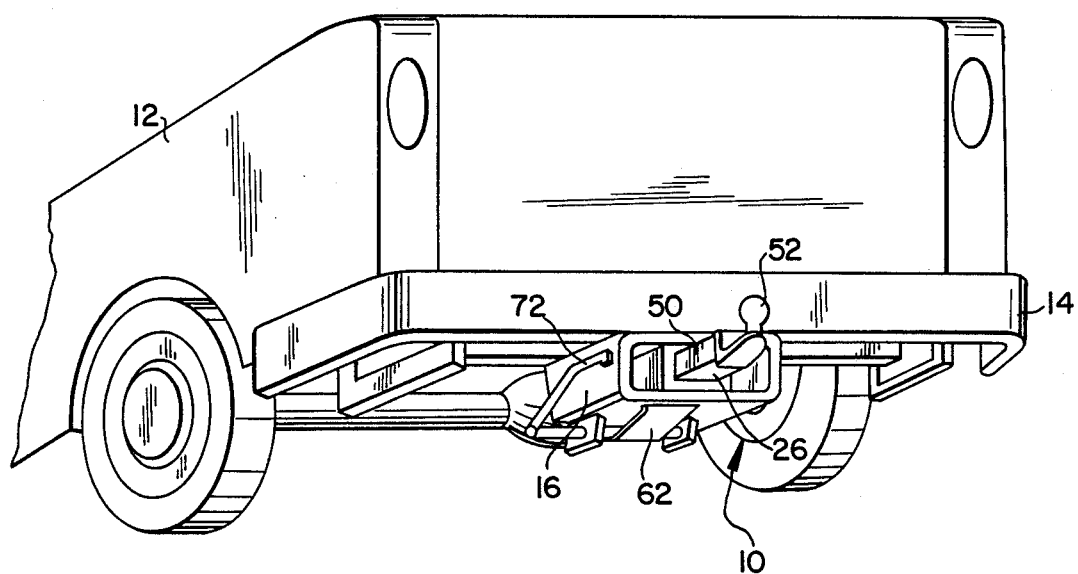
FIG. 1 is a perspective view of the hitch assembly mounted on a vehicle.
Figure 2:
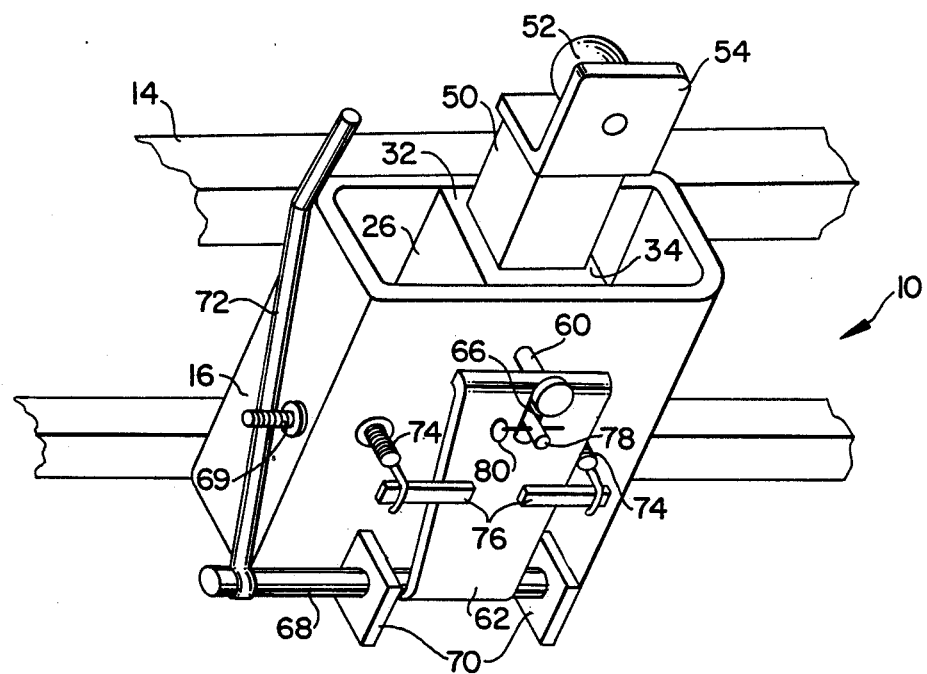
FIG. 2 is a bottom perspective view of the hitch assembly according to the present invention.

A wide-range tow hitch 10 according to the present invention is shown in FIGS. 1 and 2. Hitch 10 may be mounted in any convenient manner to the rear of a towing vehicle 12 beneath and projecting rearwardly of rear bumper 14 on vehicle 12. However, wide-range tow hitch 10 could also be mounted to project forwardly of the forward end of a vehicle to be towed for being coupled to the towing vehicle.

Wide-range tow hitch 10 includes a rectangular open-ended tubular housing 16 including a top wall 18, a spaced apart bottom wall 20, a pair of spaced apart and opposing side walls 22 and 24.

A conventional receiver tube 26 having a top wall 28 with a spaced apart bottom wall 30 and a pair of spaced apart and opposing side walls 32 and 34 is pivotally mounted with trunnions 36 within housing 16 for pivotal movement between sidewalls 22 and 24 of the housing in the space between the top and bottom walls 18 and 20 of housing 16. Trunnions 36 are mounted to the top and bottom walls of receiver tube 26 and are received by corresponding bores in the top and bottom walls respectively of housing 16.

Figure 4:
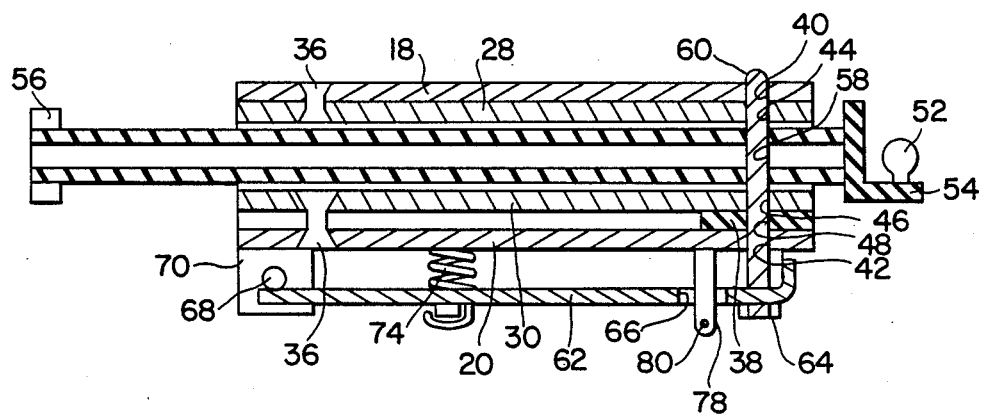
FIG. 4 is a cross-sectional view along line 4—4 in FIG. 3 with the receiver shown pivoted to a centered position.

Housing 16 further includes a bore 40 in top wall 18 and a coaxially aligned bore 42 in bottom wall 20 as shown in FIG. 4. Receiver tube 26 is provided with a bore 44 in top wall 28 of receiver tube 26 and a coaxially aligned bore 46 located in bottom wall 30 of receiver tube 26 also as shown in FIG. 4. Bores 44 and 46 may be coaxially aligned with bores 40 and 42 located in the top and bottom walls of housing 16 upon pivotal movement of receiver tube 26 within housing 16 to a bore-aligned position.

Figure 3:
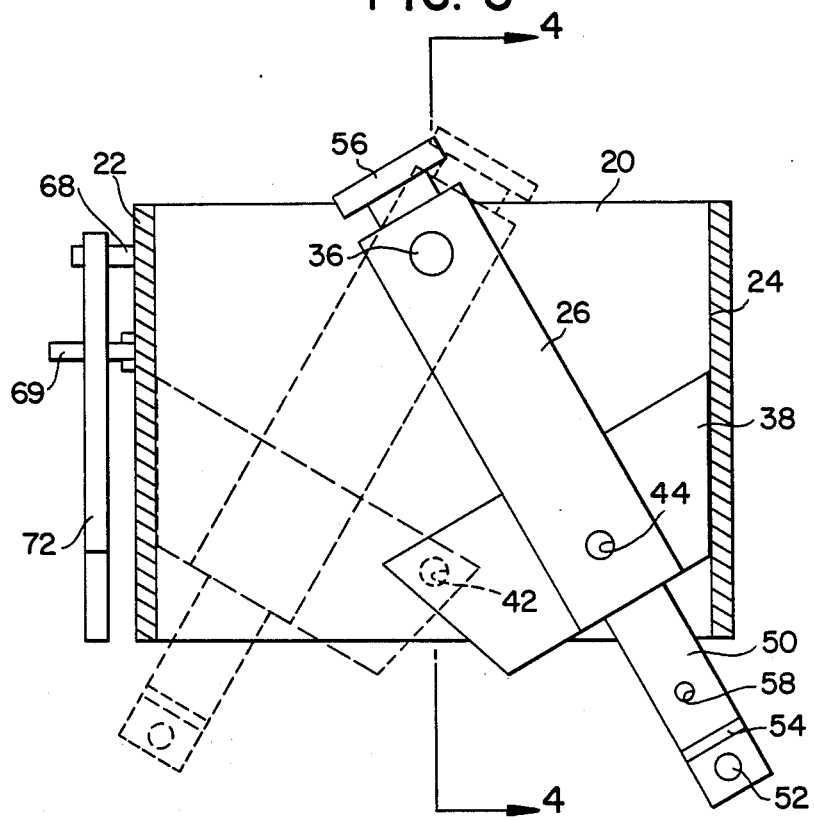
FIG. 3 is a top view of the hitch assembly shown in FIG. 2 with portions cut away.

A cam member 38 is rigidly and transversely mounted to bottom wall 30 of the receiver tube as shown in FIG. 3. The cam member includes a bore 48 as shown in FIG. 4 which is coaxially aligned with bore 46 in bottom wall 30 of receiver tube 26. Further, cam member 38 is sized to cover bore 42 in bottom wall 20 of housing 16 during pivotal movement of receiver tube 26 at all times when bore 42 is not coaxially aligned with bore 48 in cam member 38.

An elongate drawbar 50 is slidably received by receiver tube 26, and in a preferred embodiment, includes a trailer hitch towing ball 52 mounted on a ball mount fitting 54 as shown in FIG. 4. Further, drawbar 50 is provided at an end opposite towing ball 52 with a collar 56 as shown in FIG. 4 which limits the outward extension of drawbar 50 within receiver tube 26. The drawbar 50 is slidably positioned within the receiver tube and is moveable from a retracted position to a fully extended position. This drawbar includes a bore 58 which may be positioned in coaxial alignment with top and bottom bores 44 and 46 of receiver tube 26 upon slidable movement of drawbar 50 within receiver tube 26 to a bore-aligned position.

A pin 60 is sized to be received by top and bottom bores 40 and 42 of housing 16, bore 48 in cam member 38, top and bottom bores 44 and 46 of receiver tube 26, and bore 58 in drawbar 50 when all of these bores are coaxially aligned as shown in FIG. 4.

An end of pin 60 is hingedly mounted to a first end of a pin withdrawal member 62 in any convenient manner as shown in FIG. 4. In a preferred embodiment, pin 62 has a head 64 at one end thereof. The pin 60 is positioned in a slot 66 provided in pin withdrawal member 62 with the head 64 preventing the pin 60 from slipping through slot 66, slot 66 being sized larger than pin 60 to provide a hinged connection between the pin 60 and pin withdrawal member 62.

Pin withdrawal member 62 is hingedly mounted at a second end opposite to where pin 60 is connected to pin withdrawal member 62 to the exterior surface of bottom wall 20 of housing 16 as shown in FIG. 4, with a fulcrum axle 68 mounted in journals 70 which in turn are secured to housing 16 as shown.

A handle 72 is rigidly fixed to axle 68 and is sized and positioned to extend beside housing 16 toward towing ball 52. Handle 72 may be used to rotate pin withdrawal member 62 about fulcrum axle 68. Rotation restraint rod 69 is fixedly connected to rectangular housing 16 and extends away therefrom. This rod 69 is used to limit the rotation of handle 72 in a direction away from top wall 18 so that pin 60 cannot be withdrawn from bore 42.

A pair of tension springs 74 are connected to bottom wall 20 of housing 16 at one end and are connected to spring connecting rods 76 rigidly secured to pin withdrawal member 62 as shown in FIG. 2. Tension springs 74 urge the pin withdrawal member toward bottom wall 20 of housing 16, which in turn urges pin 60 in a direction from bottom wall 20 of housing 16 toward top wall 18 of housing 16.

A post 78 is sized and mounted on bottom wall 20 of housing 16 so as to extend into slot 66 of pin withdrawal member 62 as shown in FIG. 4. Post 78 has a transverse safety hole (not shown) spaced apart from bottom wall 20 so as to be beneath pin withdrawal member 62 when pin withdrawal member 62 is fully rotated toward bottom wall 20 of housing 16. A removable safety fastener 80 is sized to extend through the safety hole in post 78 and lie underneath pin withdrawal member 62 so as to support pin withdrawal member 62 and prevent it from inadvertently falling downward. Whenever pin withdrawal member 62 is fully rotated toward bottom wall 20 of housing 16 and safety fastener 80 is installed in the safety hole in post 78, safety fastener 80 then prevents the inadvertent rotation of pin member 62 away from the bottom wall 20 of housing 16 and pin 60 from being removed from bore 58 in drawbar 50 which would allow the drawbar to extend inadvertently.

In a normal towing configuration, pin 20 extends through top and bottom bores 40 and 42 of the housing, the top and bottom bores of receiver 16, the bore in cam member 38, and bore 58 in drawbar 50. In this position, all towing forces exerted on drawbar 50 are transmitted through pin 60 to the frame of towing vehicle 12.

When it is desired to use the trailer hitch 10 to couple a towed vehicle to trailer hitch 10, the towing vehicle is positioned so that towing ball 52 is proximate to a ball hitch on the towed vehicle to which towing ball 52 is to be coupled. Handle 72 is then rotated downwardly, thus rotating axle 68 and pin withdrawal member 62 to retract pin 60 from aligned bores 40; 44; 46; 48 and 58. Pin 60 is prevented from being retracted from bore 42 in bottom wall 20 of housing 16 by restraint rod 69.

With pin 60 withdrawn from the aligned bores, drawbar 50 may be extended and pivoted transversely about trunnions 36 in either direction until towing ball 52 can be positioned beneath the mating ball hitch of the vehicle to be towed.

The advantage of the present hitch assembly is that a single person can manipulate the towing ball to mate with the ball hitch on the towed vehicle. Once the towing ball 52 is manually coupled to the ball hitch, the operator may then enter the vehicle and lock the hitch by driving the vehicle to align the pin with the bores extending through the housing, the receiver tube and the drawbar. This is done by first driving the towing vehicle in a forwardly and straight direction in order to enable drawbar 50 to swing to a center position at which time pin 60 will be urged by springs 74 into bore 48 in cam member 38 and bottom bore 46 in receiver 26. When this occurs, drawbar 50 is extended to a fully extended position. When the pin is received by bores 46 and 48, the tension springs are such as to create a sound indication as the pin 60 is driven against solid drawbar 50. When this sound indication has occurred, the towing vehicle is slowly put in reverse with the drawbar being retracted into receiver tube 26. As the drawbar is retracted in the receiver tube 26, there will come a time when pin 60 will be urged into bore 58 in drawbar 50 and will then continue through top bore 44 in receiver tube 26 and top bore 40 in housing 16.

The trailer hitch is now locked in the towing position with the towing forces on the drawbar then being transmitted through pin 60 to towing vehicle 12.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims:

I claim:

1. An improved wide-range hitch comprising:
   a rectangular open-ended tubular housing having a top wall, a spaced apart bottom wall, and a pair of spaced apart and opposing side walls;
   the tubular housing having a bore located in the top wall and a bore located in the bottom wall which bore is coaxially aligned with respect to the bore in the top wall;
   a rectangular receiver tube having a top wall, and a spaced apart bottom wall, and a pair of spaced apart and opposing side walls;
   the receiver tube being pivotally mounted within the housing for pivotal movement between the side walls of the housing in the space between the top and bottom walls of the housing;
   the receiver tube further having a bore located in the top wall and a bore located in the bottom wall which bore is coaxially aligned with the bore in the top wall, both of which bores may be coaxially aligned with the bores located in the top and bottom walls of the housing upon pivotal movement of the receiver tube;
   a cam member rigidly and transversely mounted to the bottom wall of the receiver tube;
   the cam member having a bore therethrough coaxially aligned with the bore in the bottom wall of the receiver tube, the cam member further covering the bore in the bottom wall of the housing when the bore in the bottom wall of the housing is not positioned in coaxial alignment with the bore in the cam member;
   a drawbar slidably positioned within the receiver tube and movable from a retracted position to an extended position;
   the drawbar having a bore therethrough which may be positioned in coaxial alignment with the bores of the receiver tube upon slidable movement of the drawbar;
   a pin sized to be received by the bores of the housing, the cam member, the receiver tube, and the drawbar when these bores are coaxially aligned;
   a pin withdrawal member having a first end and a second end;
   the pin being hingedly and transversely mounted to the first end of the pin withdrawal member and extending in a direction to be received by the bore in the bottom wall of the housing;
   the second end of the pin withdrawal member being hingedly mounted to the exterior surface of the bottom wall of the housing;
   the pin having a first end positioned to normally rest within the bore in the bottom wall of the housing;
   resilient means connected between the pin withdrawal member and the housing for urging the first end of the pin in a direction from the bottom wall to the top wall of the housing and into the bore of the cam member, the bore in the bottom wall of the receiver, and the bore of the drawbar when these bores are coaxially aligned.

2. A wide-range hitch according to claim 1 further including a handle rigidly mounted to the pin withdrawal member.

3. A wide-range hitch according to claim 1 wherein the resilient means comprises a tension spring.

4. A wide-range hitch as described in claim 1 further including a means for preventing the pin from being inadvertently withdrawn from the bore in the drawbar.

* * * * *